(12) United States Patent
Gilpatrick

(10) Patent No.: US 8,159,084 B2
(45) Date of Patent: Apr. 17, 2012

(54) POWER DISTRIBUTION DEVICE

(75) Inventor: Richard J. Gilpatrick, Whitewater, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 322 days.

(21) Appl. No.: 12/465,378

(22) Filed: May 13, 2009

(65) Prior Publication Data

US 2010/0289333 A1  Nov. 18, 2010

(51) Int. Cl.
*H02J 1/00* (2006.01)
(52) U.S. Cl. ......................................... 307/11
(58) Field of Classification Search ............... 307/11, 307/12, 15
See application file for complete search history.

(56) References Cited

U.S. PATENT DOCUMENTS

| | | | |
|---|---|---|---|
| 5,135,413 A * | 8/1992 | Pannizzo | 439/577 |
| 6,424,060 B1 | 7/2002 | Shiely et al. | |
| 7,015,404 B2 | 3/2006 | Sodemann et al. | |
| 7,015,599 B2 | 3/2006 | Gull et al. | |
| 7,020,790 B2 * | 3/2006 | Mares | 713/340 |
| 7,043,543 B2 * | 5/2006 | Ewing et al. | 709/223 |
| 7,053,497 B2 | 5/2006 | Sodemann et al. | |
| 7,104,847 B2 | 9/2006 | Sodemann et al. | |
| 7,271,346 B1 | 9/2007 | Ettinger et al. | |
| 7,356,384 B2 | 4/2008 | Gull et al. | |
| 7,369,059 B2 * | 5/2008 | Hoffmann et al. | 340/815.45 |
| 7,390,224 B2 | 6/2008 | Sodemann et al. | |
| 7,471,505 B2 | 12/2008 | Gull et al. | |
| 7,719,835 B1 * | 5/2010 | Schluter | 361/695 |
| 2005/0216131 A1 | 9/2005 | Sodemann et al. | |

OTHER PUBLICATIONS

"Generator-BuddyPowrPath™,Power Cord Entry and Window Lock System," printed from website www.powrpath.com on May 12, 2009, 4 pages.

* cited by examiner

*Primary Examiner* — Albert W Paladini
(74) *Attorney, Agent, or Firm* — Foley & Lardner LLP

(57) ABSTRACT

A window power distribution device includes a housing with an extension attached to the housing. Together, the housing and extension are designed to form a seal in a window opening. The window power distribution device also includes an electrical input attached to the housing, a display, and a socket, where the socket is wired to the input. The display is designed to provide information relating to the power distribution device.

14 Claims, 6 Drawing Sheets

POWER DISTRIBUTION DEVICE

BACKGROUND

The present invention relates generally to the field of power distribution devices, such as power strips. More specifically, the invention relates to devices that facilitate the delivery of electrical power from the exterior to the interior of a building through an existing opening in the building, such as a window.

During a power outage, a secondary power generator may be utilized to provide back-up electricity to a home or other building. Combustion-type generators are operated outdoors to prevent occupants from being exposed to combustion byproducts. To deliver electricity to the interior of a building, extension cords may be passed through open doors or windows. However, as a result, it may be difficult to fully close the doors or windows, allowing noise and pests to enter, and conditioned air to exit.

SUMMARY

One embodiment of the invention relates to a window power distribution device including a housing with an extension attached to the housing. Together, the housing and extension are designed to form a seal in a window opening. The window power distribution device also includes an electrical input attached to the housing, a display, and a socket, where the first socket is wired to the input. The display is designed to provide information relating to the power distribution device.

Another embodiment relates to a power distribution device and power monitoring device including a housing with an attached electrical input, a first socket, a second socket, and a third socket, the sockets wired to the electrical input. The device further includes a sensor designed to detect a characteristic of an electrical communication between the input and at least one of the sockets. Also, the device includes a display designed to provide information relating to the characteristic.

Still another embodiment relates to a portable power distribution system. The system includes a portable housing having an electrical input, a first socket, and a second socket. The sockets are wired to the electrical input. The system further includes a first breaker switch and a second breaker switch, the switches positioned in electrical series between the input and the first and second sockets, respectively. Also, the system includes a load management controller designed to operate the breaker switches in a pre-assigned order in response to a load exceeding a threshold.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1A:
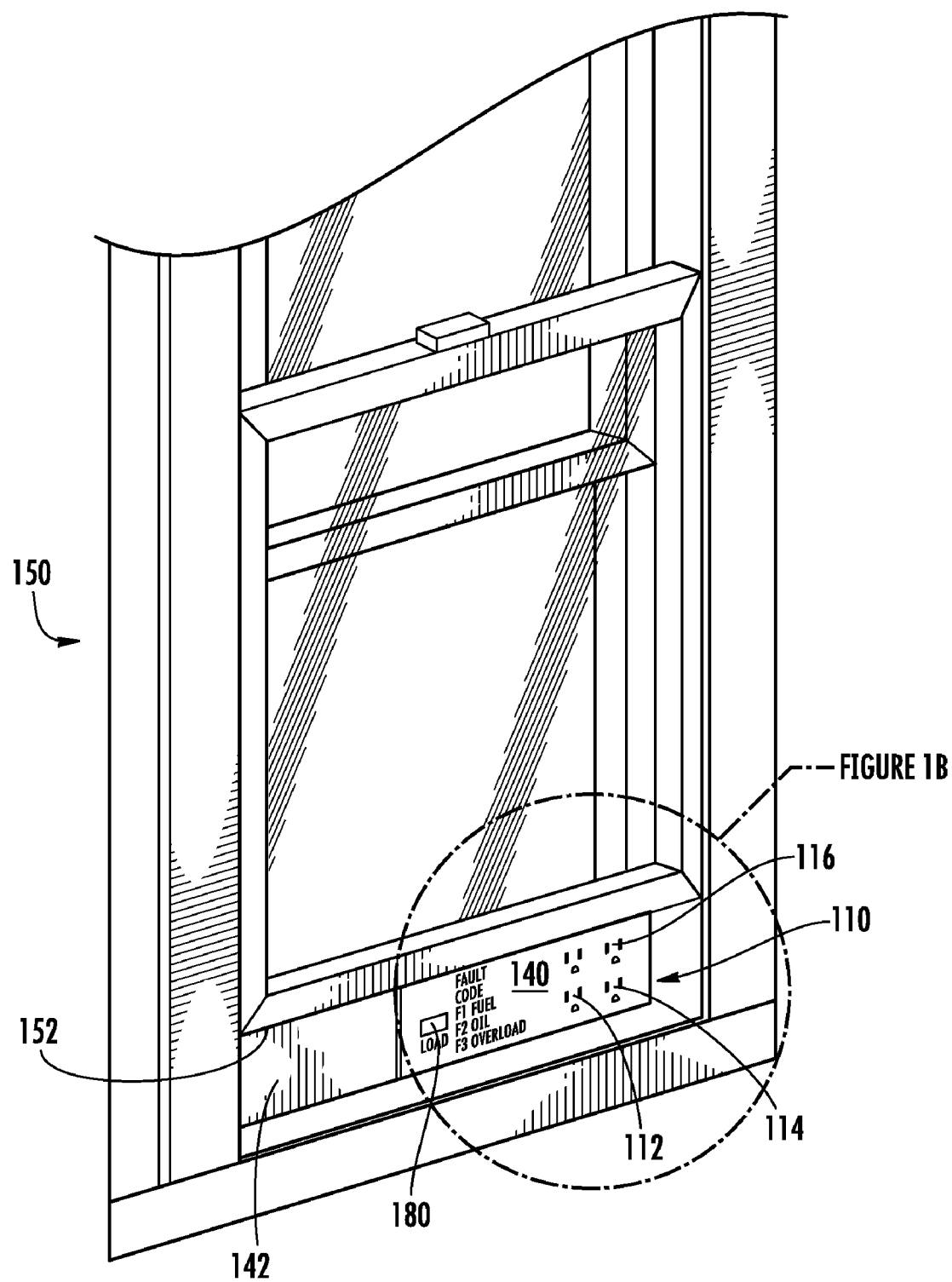
FIG. 1A is a perspective view of an interior side of a power distribution device installed in a window according to an exemplary embodiment.
Figure 1B:
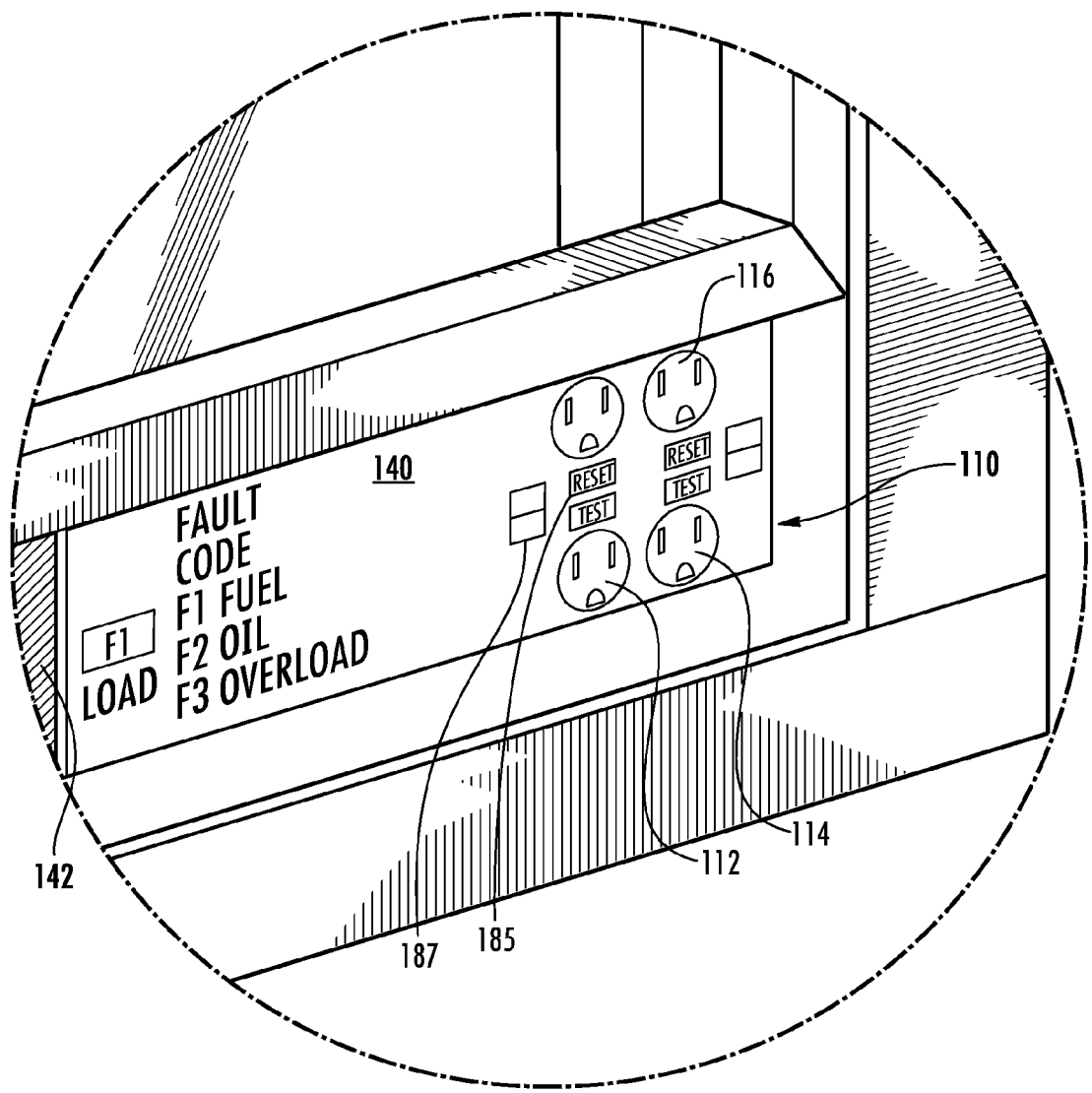
FIG. 1B is a close-up perspective view of an interior side of the power distribution device of FIG. 1A.
Figure 1C:
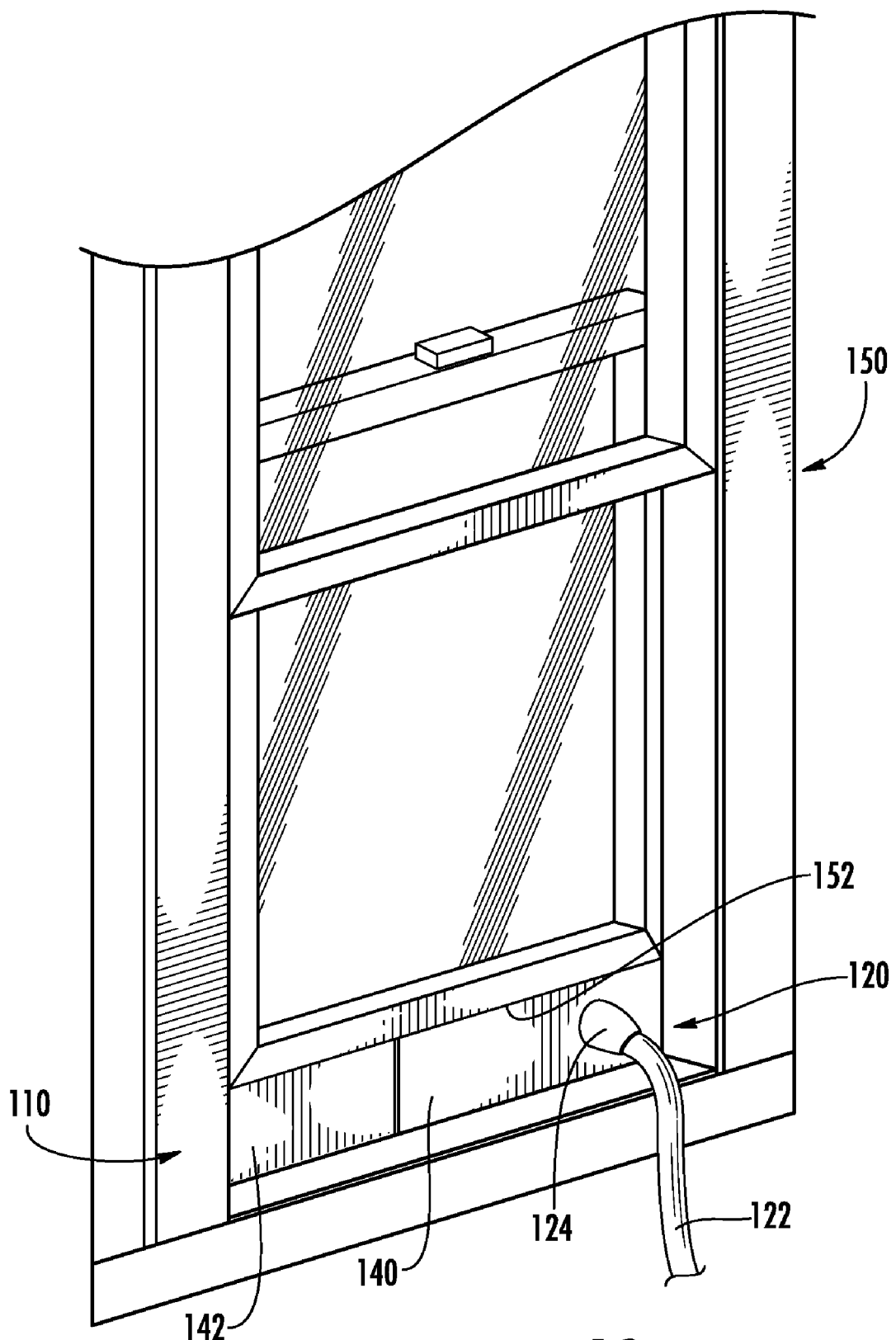
FIG. 1C is a perspective view of an exterior side of the power distribution device of FIG. 1A.

Referring to FIGS. 1A, 1B and 1C, a power distribution device in accordance with an exemplary embodiment is shown as a power distribution device 110, where the power distribution device 110 is configured to fit within an opening 152 of a window 150 (e.g., between a sash and a sill). The power distribution device 110 includes one or more sockets, such as sockets 112, 114, 116, a housing 140, an extension 142, and a display 180. The extension 142 is coupled to and extends from at least one of a right, left, top, bottom, front, or back side of the housing 140. The power distribution device 110 includes an electrical input 120 (see FIG. 1C) in the form of a power cord 122 extending into the housing 140, coupling the power distribution device 110 to an outside power source, such as a portable generator 190 (see FIGS. 2-3). As shown in FIG. 1C, the electrical input 120 is covered by a housing extension 124, where the extension 124 is configured to shield entrance of the power cord 122 into the housing 140 from rain, sleet, snow, etc. Within the housing 140, the electrical input 120 is wired to the sockets 112, 114, 116. The power distribution device 110 also includes a resettable and testable ground fault protection 185 and a resettable thermal-sensitive circuit breaker 187. In some embodiments, the ground fault protection 185 is connected to a grounded generator.

The extension 142 allows the power distribution device 110 to fit within a range of differently sized openings, where the housing 140 is sized to fill a portion of the window opening 152, and the extension 142 fills the remainder of the opening 152. In various embodiments, the extension 142 materials include vinyl, woven plastic, acrylonitrile butadiene styrene, polypropylene, other plastics, ceramic, aluminum, other metals, composite, foam, and combinations thereof. In some embodiments, the extension 142 is solid and slides or telescopes to fill the remainder of the opening 152. In other embodiments, the extension 142 is a folding piece that extends from the housing 140, where the piece folds in a roll, an accordion-like fold, or another folding pattern.

As shown in FIG. 1, the display is an active display 180 and includes a liquid crystal panel (or other display, such as an organic light-emitting diode display, a traditional light-emitting diode display, etc.), where the display 180 is designed to provide information relating to an electricity usage in the power distribution device 110. Such information may include faults occurring in a connected circuit, where the faults could be an overloading condition, an advanced state of fuel consumption in a secondary generator, an unsustainable load, or other faults. Such information may also provide percentages of loads consumed through each of the sockets 112, 114, 116. Additionally, the display 180 may provide user interface information, such as relaying elected settings chosen by a user. Such settings may include a user-assigned loading priority to the sockets 112, 114, 116, such that if an overload condition occurs, power to the sockets 112, 114, 116 may be terminated in accordance with the user-assigned priority. The power distribution device 110 also includes a resettable and testable ground fault protection 185 and a resettable thermal-sensitive circuit breaker 187.

Figure 2:
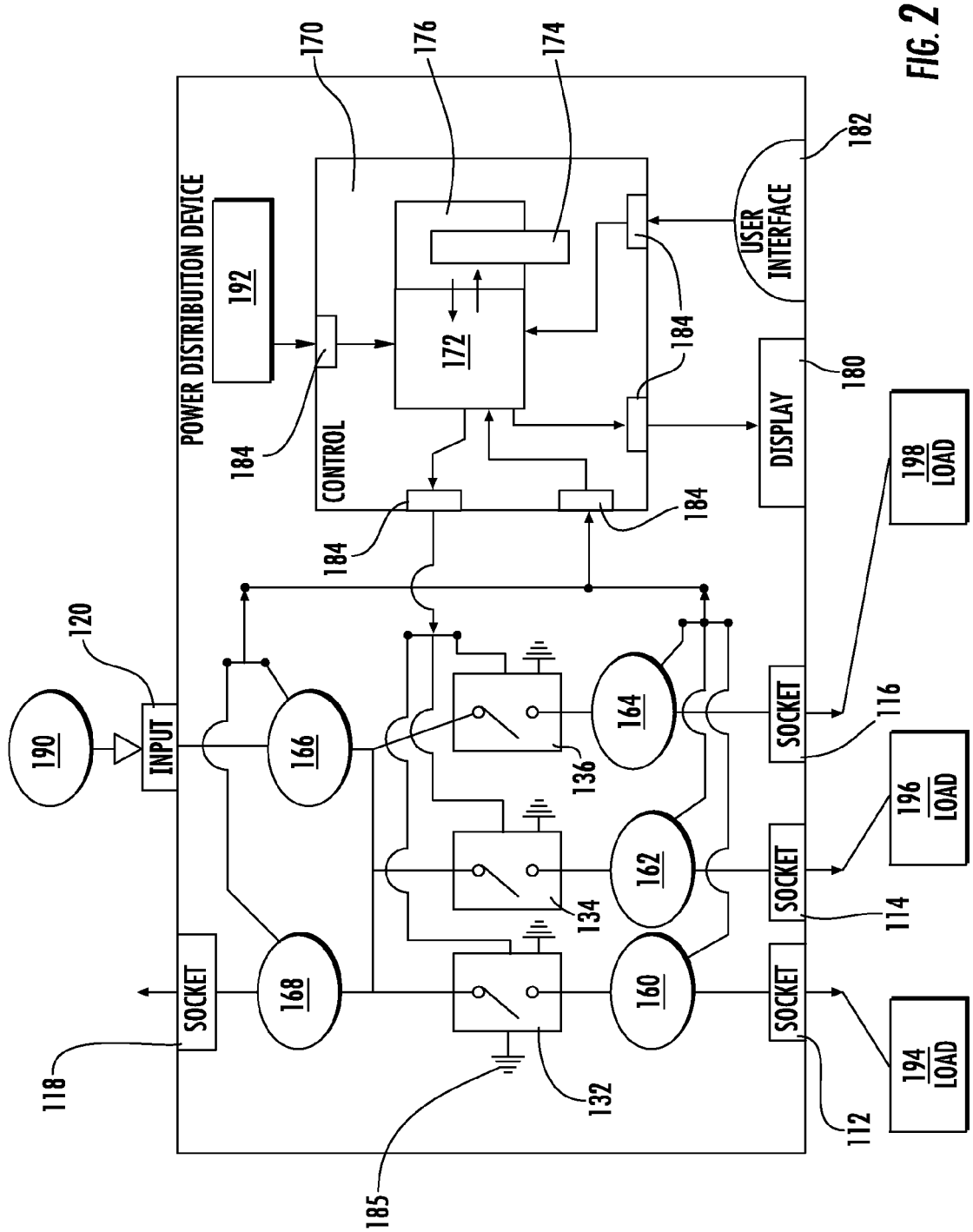
FIG. 2 is a schematic diagram of an outdoor generator, a power distribution device, and various loads in a building according to an exemplary embodiment.

FIG. 2 shows a block diagram of an exemplary embodiment of the power distribution device 110, including the electrical input 120, the sockets 112, 114, 116, sensors 160, 162, 164 and switches 132, 134, 136 (e.g., circuit breakers, relays, fuses, etc.) positioned between the input 120 and the sockets 112, 114, 116. A controller 170 is connected to the switches 132, 134, 136, the sensors 160, 162, 164, a display 180, and a user interface 182, where the controller further includes a processor 172, a logic module 174, and memory 176. Additional interfaces 184 coupled to the controller 170 allow for data transmission and other communication between the controller 170 and the sensors 160, 162, 164, the switches 132, 134, 136, the display 180, the user interface 182, and an internal power source 192, such as a battery or capacitor. In operation, power may be transmitted to the power distribution device 110 from an outside source, such as the secondary generator 190, and the power may then be distributed in a controlled manner through the sockets 112, 114, 116 to circuits and loads throughout a household or other structure.

The sensors 160, 162, 164 are positioned between the input 120 and the sockets 112, 114, 116, respectively, where the sensors 160, 162, 164 are configured to detect, quantify, or qualify characteristics of the electrical communication between the input 120 and the sockets 112, 114, 116. Such characteristics may include electrical voltage, amperage, or other characteristics, such as net power consumed (by integrating voltage or current with respect to time, calculated in the processor 172). Additional sensors may be positioned throughout the power distribution device 110, such as a sensor 166 adjacent to the electrical input 120, to measure characteristics of the electricity entering the power distribution device 110. The power distribution device 110 may include an additional socket 118, positioned on the same side of the housing 140 as the input 120, and a sensor 168 may be positioned between the input 120 and the additional socket 118. Other sensors may be located between the internal power source 192 and the controller 170, between the user interface 182 and the controller 170, and in other locations. Additionally, the controller 170 may receive data from remote sensors. For example, remote sensors may collect data from a generator, such as fuel levels, oil levels, or the status of breaker switches on the generator 190, where the data may be transmitted to the controller 170 wirelessly (e.g., with an RF transmitter and receiver) or via other methods of data communication.

The switches 132, 134, 136 are positioned in series between the input 120 and the sockets 112, 114, 116, respectively, where the switches 132, 134, 136 are configured to allow the controller 170 to permit or deny an electrical communication between the input 120 and the sockets 112, 114, 116. For example, relays powered by the internal power source 192 may open switches 134 and 136, while simultaneously closing switch 132. In some embodiments, the switches 132, 134, 136 are configured to automatically open if electric current or voltage exceeds a predetermined threshold corresponding to an overload condition (e.g., providing ground fault protection).

The controller 170 includes the processor 172, the logic module 174, the memory 176, and the interfaces 184. The processor 172 is coupled to other components of the power distribution device 110, such as the display 180 and the user interface 182. The display 180 and interfaces 182, 184 may be coupled via data transmission or communication media, such as fiber optic or coaxial cable, wiring, radio or infrared signal transmitters and receivers, hydraulic or pneumatic channels, mechanical linkages, etc. The processor 172 may receive inputs from the sensors 160, 162, 164, 166, 168, the user interface 182, the memory 176, the logic module 174, and other sources. The user interface 182 may include a graphical user interface including a touch screen or other user interfaces, such as buttons, knobs, dials, a keyboard, toggles, etc., allowing a user to interact with the processor 172, which may then communicate back to the user through the display 180.

The processor 172 receives instructions from the logic module 174 or logic stored in the memory 176, and additional inputs from other items, such as a digital clock or a band-pass filter (for removing noise from sensor signals), and produces instructions to operate the switches 132, 134, 136, the display 180, or other features of the power distribution device 110. Inputs and logic may be evaluated, calculated, and manipulated by the processor 172, where the processor 172, or one or more components coupled to processor 172, may be configured to provide a controller output signal or command to other components in the power distribution device 110. As such, the output signal or command (e.g., open switch, close switch) is based upon calculations performed in the processor 172. The processor 172 can also be or include one or more processing components or processors. The processor 172 can be a general purpose processor, an application-specific integrated circuit, or any other collection of circuitry components configured to conduct the calculations or to facilitate the activities described herein. The processor 172 can be configured to execute computer code, script code, object code, or other executable instructions stored in memory 176, other memory, or in the processor 172. In some embodiments, the memory 176 may store coded instructions, such as the logic module 174, in various states, such as volatile, non-volatile, RAM, ROM, solid states, and the like. In certain embodiments, the logic module 174 may be stored in a separate memory, such as a memory of one or more remote computers coupled to the power distribution device 110 via an external computer network, local area network, or the internet.

The logic module 174 is configured to run in the processor 172 in one or more steps based upon pre-assigned instructions, data stored in the memory 176, input from the user interface 182, input from the sensors 160, 162, 164, 166, 168, and input from other sources, such as digital clocks, thermocouples, and piezoelectric crystals. In other embodiments, the controller 170 does not include a logic module or processor, and instead the controller performs simply as a ground fault protection for the power distribution device 110, opening the switches 132, 134, 136 based on a then-occurring voltage or current to prevent overload damage and to protect a user from accidental electric shock. Additionally, ground fault protection 185 may help to protect the generator 190 from short-circuiting or overloading.

In at least one embodiment, the logic module 174 is configured for determining a state of power consumption or a fault condition pertaining to the power distribution device 110, the generator 190, or other components, where the logic module 174 includes several logical steps. One step includes determining a voltage or current between the electrical input 120 and the sockets 112, 114, 116, based upon readings from the sensors 160, 162, 164. Another step includes integrating the voltage or current with respect to time to determine net power consumption. Yet another step includes sensing a fuel reserve in an auxiliary power generator, and reporting (on the display 180) a state of the fuel reserve, for example 'eighty-percent remaining,' or 'two hours of power remaining at a present rate of consumption,' or other details. Still other steps include presenting current fuel levels compared to initial levels or pre-determined level thresholds, and presenting corresponding fault conditions or fault codes, such as 'low fuel,' 'add fuel,' 'shutting down generator,' or 'five minutes remaining of auxiliary power' (displayed via written words, sounds, lights, colors, numerals, letters, or other symbols).

The logic module 174 may be configured to direct load management and prioritization of the sockets 112, 114, 116, and their corresponding loads and circuits. For example, in one embodiment, the sensor 166 indentifies to the processor 172 a magnitude of voltage or current passing through the power distribution device 110. The processor 172 also retrieves a threshold voltage or current from the memory 176, where the threshold corresponds to an overloading voltage or current for the secondary power generator 190 (e.g., retrieving data indentifying a designated threshold voltage of ninety-percent of the maximum safe generator voltage). The processor 172 then compares the sensed voltage or current to the threshold. If the sensed voltage or current is less than the threshold, the controller 170 may close (or leave closed) one of the switches 132, 134, 136. In at least one embodiment, an informational message may be presented on the display 180 reporting that the sensed voltage is less than the threshold (e.g., a green LED may be lit). However, if the sensed voltage or current exceeds the threshold, then the controller 170 may open one (or more than one) of the switches 132, 134, 136. In some embodiments, the controller 170 may provide a corresponding informational warning message on the display 180 to inform a user that the sensed voltage or current exceeds a first threshold (e.g., eighty-percent of the maximum safe generator voltage). If the sensed voltage or current exceeds a second threshold (e.g., ninety-five percent of the maximum safe generator voltage), then the controller will automatically open one or more of the switches 132, 134, 136 and simultaneously display a fault code or provide an alarm (e.g., beeping sound or red LED). A user may manually reset the switches 132, 134, 136 or open the switches 132, 134, 136 through the user interface 182, or with other reset buttons, toggles, etc.

In at least one embodiment, the power distribution device 210 is coupled to a security sensor 191. The security sensor 191 may be an optical sensor, a motion detector, an accelerometer, a vibrometer, a proximity sensor, or another form of sensor, where the security sensor 191 is configured to detect unauthorized activity, such as movement or tampering with the generator 190. The security sensor 191 may be fastened to the generator 190 directly, attached to a plug on the power cord 122, or otherwise located. The security sensor 191 may be connected to the power distribution device 210 by an independent wire, may send a signal to the power distribution device 210 through the power cord 122, may be linked to the power distribution device 210 by wireless communication, or may be otherwise connected to the power distribution device 210. When unauthorized motion or tampering with the generator 190 occurs, the power distribution device 210 activates an alarm with lights or sounds to notify a user.

Figure 3:
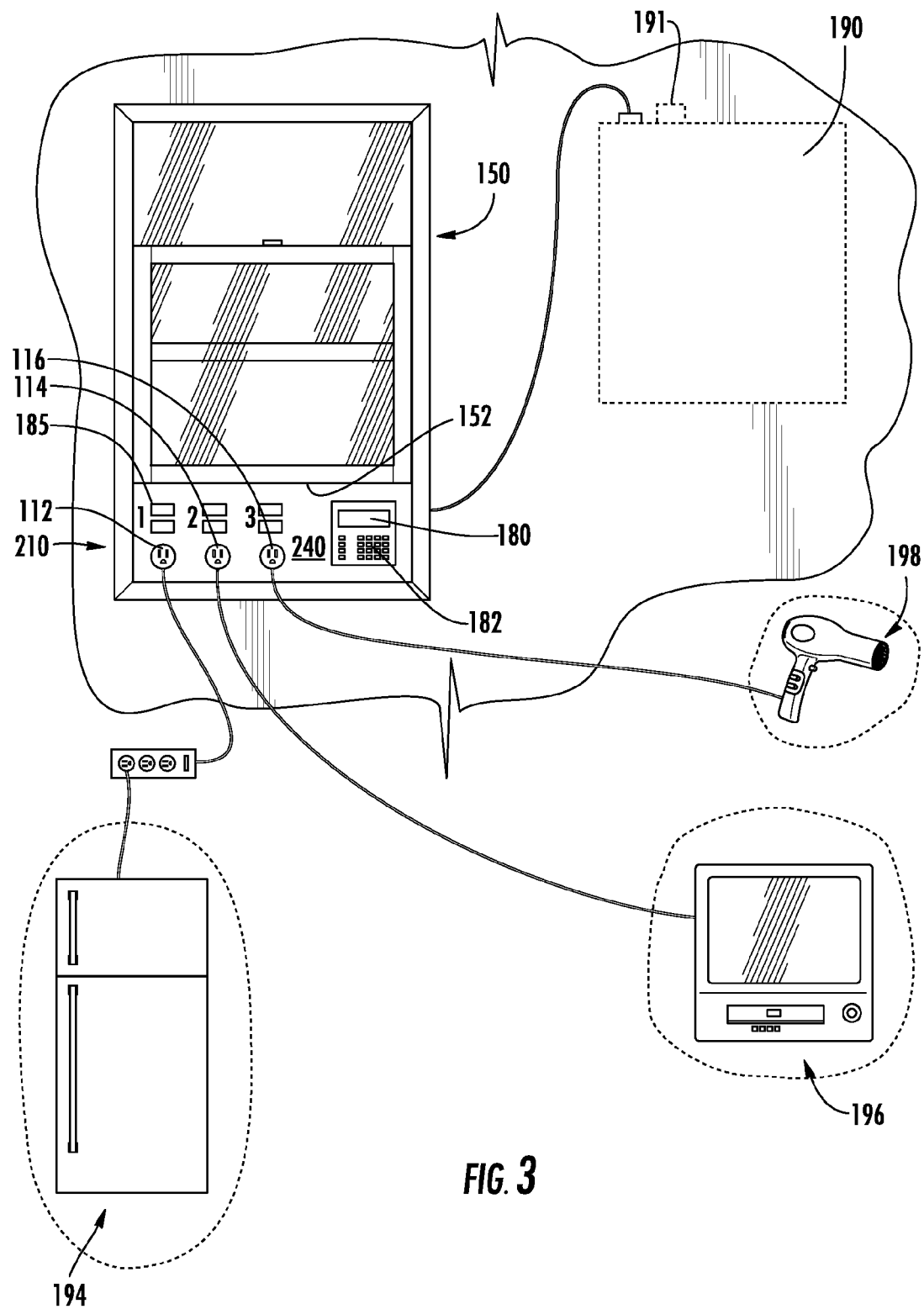
FIG. 3 is a schematic view of a power distribution device configured to distribute power from an outdoor generator to electrical loads according to an exemplary embodiment.

Referring now to FIG. 3, the power distribution device 210 is shown in accordance with another exemplary embodiment. The power distribution device 210 is sized to fit within the window 150, and includes forms of the sockets 112, 114, 116, the display 180, and the user interface 182. The power distribution device 210 is configured to receive power from the secondary generator 190, and to transmit the power to satisfy electrical loads 194, 196, 198. According to one example, the load 194 may include a refrigerator. The load 196 may include a television. The load 198 may include an electric hair dryer. If the generator 190 is unable to support all of the loads 194, 196, 198, then the controller 170 may open the circuit breaker switch (see, e.g., FIG. 2) pertaining to the load 198, cutting power to the hair dryer. However, devices coupled to the sockets 112, 114 may continue to receive power from the generator 190. A user more interested in running the hair dryer than cooling the refrigerator can reprioritize the load priority through the user interface 182, and reset the circuit breaker switch in series with the socket 116 supplying power to the hair dryer and curling irons.

Figure 4A:
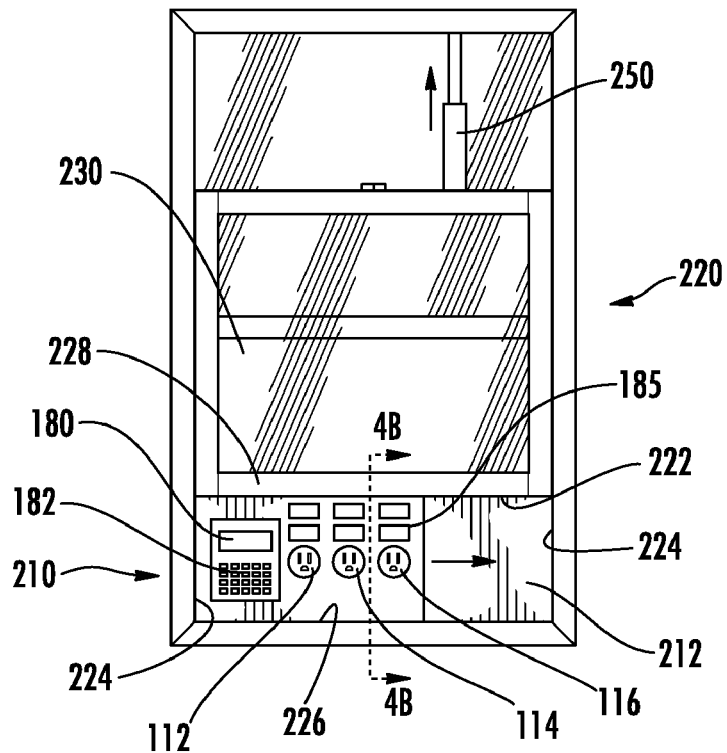
FIG. 4A is an front view of a power distribution device according to an exemplary embodiment.
Figure 4B:
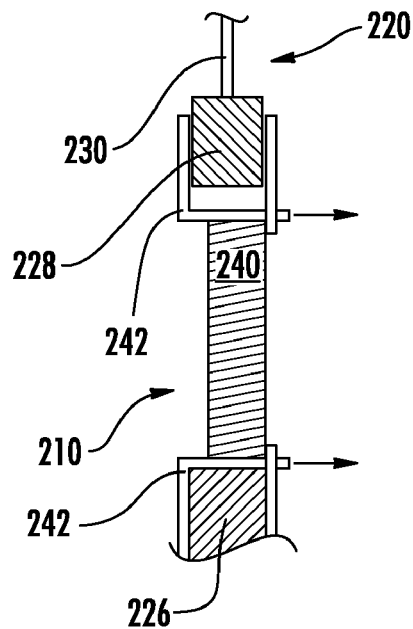
FIG. 4B is a sectional view of the power distribution device of FIG. 4A, taken along line 4B-4B of FIG. 4A.

FIG. 4A shows an alternate embodiment of the power distribution device 210 with a housing 240, further including an extension 212. The power distribution device 210 is placed in an opening 222 of a window 220, between window jambs 224, a window sill 226, and a rim 228 of a lower window sash 230. FIG. 4B shows a sectional view of the power distribution device 210, where the power distribution device 210 is coupled to the window sill 226 and rim 228 via fasteners in the form of sliding, ratcheting flanges 242. In other embodiments, the fasteners are clamps, flanges with threaded ends and butterfly nuts for tightening, or other releasable fasteners. Other embodiments use fasteners that are separate from the housing 240, such as a telescoping pillar 250 that locks the lower window sash 230 onto the power distribution device 210 by extending from above the sash 230 to the top of the window 220, or a ratcheting member placed in the window jambs 224. Still other power distribution devices rely upon the weight of the window sash 230 to hold the power distribution device 210 in place, without an additional fastener. Other embodiments use combinations of fasteners. In some embodiments the power distribution device 210 may lock into the window 220, deterring theft of the power distribution device 210 and securing the window 220.

The housing 240 may be formed from a dielectric material having thermal insulating and leak-proof characteristics. Some exemplary housing materials include acrylonitrile butadiene styrene, polypropylene, other plastics, ceramic, aluminum, other metals, composite, foam, and combinations thereof. The combination of the extension 212, the fasteners (e.g., flanges 242), and the housing 240 is configured to form a substantially leak-proof seal or barrier in the window opening 222, where the seal substantially prevents rain from entering through the window opening 222. Additionally the seal is resistant to heat transfer through the window opening 222. For example, some embodiments have an overall thermal resistance (R-value) greater than about R–1, and more preferably greater than about R–5, where the units of R-values are in degrees Fahrenheit, square feet hours per Btu (ft$^{2.\circ}$ F.·h/Btu) per inch of power distribution device 210 thickness.

In other embodiments, the power distribution devices 110, 210 may be designed for use in a door, may be free-standing, or may be attached directly to a secondary generator housing. Additionally, while the power distribution devices 110, 210 are shown to transmit power from an outdoor generator, in other applications, the power distribution devices 110, 210 can be flipped to power outdoor equipment, such as patio lighting or leaf blowers, with power from an indoor outlet coupled to a primary (utility) power grid.

The construction and arrangement of the window power distribution device as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A window power distribution device, comprising:
a housing;
an extension coupled to the housing, wherein the housing and the extension are configured to form a seal in a window opening;
an electrical input coupled to the housing;
a socket coupled to the input;
a sensor configured to detect a characteristic on an electrical circuit including the socket;
a first breaker switch positioned in electrical series between the input and the socket; and
a display configured to provide information relating to the power distribution device.

2. The power distribution device of claim 1, wherein the information comprises an indication of a fault.

3. The power distribution device of claim 2, further comprising an alarm configured to indicate whether the fault has occurred.

4. The power distribution device of claim 1, further comprising a manual reset coupled to the first breaker switch, wherein operating the manual reset closes the first breaker switch.

5. The power distribution device of claim 4, further comprising a second socket and a second breaker switch, wherein the second socket is coupled to the input, and wherein the second breaker is positioned in electrical series between the input and the second socket.

6. The power distribution device of claim 5, further comprising a load management controller, wherein the controller is configured to operate the first breaker switch and the second breaker switch in accordance with a priority order.

7. A power distribution and monitoring device, comprising:
a housing;
an extension coupled to the housing;
a fastener coupled to the housing for supporting a window pane, wherein the housing, the fastener, and the extension are configured to form a seal in a window frame;
an electrical input coupled to the housing;
a first socket, a second socket, and a third socket, the sockets coupled to the input;
a sensor configured to detect a characteristic of an electrical communication between the input and at least one of the first, second, or third sockets; and
a display configured to provide information relating to the characteristic, wherein the information comprises a fault code presented on the display; and
a first switch positioned in electrical series between the input and the first socket,
a second switch positioned in electrical series between the input and the second socket,
a third switch positioned in electrical series between the input and the third socket, and
a load management controller, wherein the controller is configured to operate the first switch, the second switch, and the third switch in accordance with a pre-defined priority order.

8. The device of claim 7, further comprising an alarm coupled to a security sensor, the alarm configured to indicate when the security sensor detects unauthorized activity.

9. The device of claim 7, further comprising a ground fault protection and a manual reset coupled to the first switch, wherein operating the manual reset closes the first switch.

10. A portable power distribution system, comprising:
a portable housing having an electrical input;
a first socket coupled to the input;
a first breaker switch positioned in electrical series between the input and the first socket;
a second socket configured for an electrical communication with the input;
a second breaker switch positioned in electrical series between the input and the second socket; and
a sensor that is sensitive to a parameter related to electrical load;
a load management controller in communication with the sensor and configured to operate the first breaker switch and the second breaker switch in a pre-assigned order in response to the load exceeding a threshold.

11. The system of claim 10, further comprising a manual reset coupled to the first breaker switch, wherein operating the manual reset closes the first breaker switch.

12. The system of claim 10, further comprising a display configured to provide information relating to a characteristic of the distribution system.

13. The system of claim 12, further comprising an extension coupled to and extending from the housing.

14. The system of claim 13, further comprising a portable generator coupled to the input by a power cord.

* * * * *